United States Patent
Tanabe

(10) Patent No.: US 10,833,733 B2
(45) Date of Patent: Nov. 10, 2020

(54) POWER SUPPLY APPARATUS AND ELECTRONIC DEVICE, AND CONTROL METHOD THEREOF, AND WIRELESS POWER TRANSMISSION SYSTEM

(71) Applicant: CANON KABUSHIKI KAISHA, Tokyo (JP)

(72) Inventor: Akihiro Tanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/299,397

(22) Filed: Mar. 12, 2019

(65) Prior Publication Data
US 2019/0215032 A1  Jul. 11, 2019

Related U.S. Application Data

(63) Continuation of application No. PCT/JP2017/046101, filed on Dec. 22, 2017.

(30) Foreign Application Priority Data

Feb. 27, 2017  (JP) ................. 2017-035108

(51) Int. Cl.
H04B 5/00 (2006.01)
H02J 50/20 (2016.01)
(Continued)

(52) U.S. Cl.
CPC .......... H04B 5/0037 (2013.01); G06F 21/44 (2013.01); H02J 7/00 (2013.01); H02J 7/025 (2013.01);
(Continued)

(58) Field of Classification Search
CPC ... H04B 5/0037; H03J 7/00; H02J 7/00; H02J 50/80; H02J 7/00034; H04W 4/80
(Continued)

(56) References Cited

U.S. PATENT DOCUMENTS

2011/0316476 A1* 12/2011 Washiro ................. H02J 7/025
320/108
2013/0200843 A1   8/2013 Tanabe
(Continued)

FOREIGN PATENT DOCUMENTS

JP    2008-113519 A    5/2008
JP    2010-028935 A    2/2010
(Continued)

OTHER PUBLICATIONS

The above foreign patent documents 2, 4 and 5 were cited the International Search Report of PCT/JP2017/046101 dated Feb. 13, 2018.

(Continued)

Primary Examiner — Vernal U Brown
(74) Attorney, Agent, or Firm — Cowan, Liebowitz & Latman, P.C.

(57) ABSTRACT

According to the present invention, the communication mode can be prevented from changing when re-authentication is performed. To achieve this, a power supply apparatus that wirelessly supplies power to an electronic device, comprises a communicating unit that contactlessly transmits power and transmits/receives information, a holding unit that holds, when authentication is first performed with an electronic device via the communicating unit, information indicating a communication mode when communication is established with the electronic device, and a controlling unit that controls the communicating unit so as to perform communication in a communication mode based on the information held in the holding unit, when a second authentication is performed with the electronic device via the communicating unit.

17 Claims, 9 Drawing Sheets

(51) Int. Cl.
- *H02J 50/12* (2016.01)
- *G06F 21/44* (2013.01)
- *H02J 50/80* (2016.01)
- *H04W 12/06* (2009.01)
- *H02J 7/02* (2016.01)
- *H02J 7/00* (2006.01)
- *H02J 50/60* (2016.01)

(52) U.S. Cl.
CPC ............. *H02J 50/12* (2016.02); *H02J 50/20* (2016.02); *H02J 50/60* (2016.02); *H02J 50/80* (2016.02); *H04B 5/0056* (2013.01); *H04W 12/06* (2013.01)

(58) Field of Classification Search
USPC .......................................................... 340/5.8
See application file for complete search history.

(56) References Cited

U.S. PATENT DOCUMENTS

| | | |
|---|---|---|
| 2014/0183978 A1 | 7/2014 | Tanabe |
| 2015/0097445 A1 | 4/2015 | Tsukamoto |

FOREIGN PATENT DOCUMENTS

| | | |
|---|---|---|
| JP | 2010-284065 A | 12/2010 |
| JP | 2014-128148 A | 7/2014 |
| JP | 2015-076998 A | 4/2015 |

OTHER PUBLICATIONS

The above patent documents were cited in a European Partial Search Report dated Sep. 23, 2020, a copy of which is enclosed, that issued in the corresponding European Patent Application No. 17898168.4.

* cited by examiner

POWER SUPPLY APPARATUS AND ELECTRONIC DEVICE, AND CONTROL METHOD THEREOF, AND WIRELESS POWER TRANSMISSION SYSTEM

CROSS-REFERENCE TO RELATED APPLICATIONS

This application is a Continuation of International Patent Application No. PCT/JP2017/046101, filed Dec. 22, 2017, which claims the benefit of Japanese Patent Application No. 2017-035108, filed Feb. 27, 2017, both of which are hereby incorporated by reference herein in their entirety.

BACKGROUND OF THE INVENTION

Field of the Invention

The present invention related to a wireless power transmission technology.

Background Art

In recent years, a contactless power supply system has been known that includes a power supply apparatus that wirelessly outputs power and an electronic device that charges a battery using power wirelessly supplied from the power supply apparatus without the apparatus and the device being connected using a connector.

In such a wireless power transmission system, a power supply apparatus has been known that alternatingly performs communication for transmitting a request to an electronic device and power transmission to the electronic device using the same antenna (Patent Document 1).

Also, a method of using NFC (Near Field Communication) in communication in the wireless power transmission system is also disclosed (Patent Document 2). There are several communication modes in NFC, namely, the reader/writer mode and an initiator in the peer mode on an electromagnetic field generation side, and the card emulation mode and a target in the peer mode on an electromagnetic field receiving side. When NFC is used in communication in the wireless power transmission system, a power supply apparatus and an electronic apparatus need to perform communication in any of these communication modes.

CITATION LIST

Patent Literature

PTL1: Japanese Patent Laid-Open No. 2008-113519
PTL2: Japanese Patent Laid-Open No. 2010-284065

SUMMARY OF THE INVENTION

In the case where, when switching between power supply and communication is performed in NFC communication and a power supply apparatus and an electronic device are reconnected, the electromagnetic field therebetween is turned off in a period between communication and power supply, NFC authentication needs to be performed for each communication. When NFC authentication is performed, it is possible that the communication modes, in NFC, of the apparatus and the device are switched. However, on the other hand, there is demand for the communication mode to be intentionally fixed to one of the modes.

The present invention is to provide a technology for not changing the communication mode from that used before NFC re-authentication is performed.

In order to solve this problem, the power supply apparatus of the present invention may have the following configuration, for example. That is, the power supply apparatus is a power supply apparatus that wirelessly supplies power to an electronic device, and includes: a communicating unit configured to contactlessly transmit power and transmit and receive information; a holding unit configured to hold, when authentication is first performed with an electronic device via the communicating unit, information indicating a communication mode when communication is established with the electronic device; and a controlling unit configured to control the communicating unit so as to perform communication in a communication mode based on the information held in the holding unit, when a second authentication is performed with the electronic device via the communicating unit.

According to the present invention, the communication mode can be prevented from changing when re-authentication is performed.

Further features of the present invention will become apparent from the following description of exemplary embodiments with reference to the attached drawings.

DESCRIPTION OF THE EMBODIMENTS

Hereinafter, embodiments of the present invention will be described in detail with reference to the following drawings.

First Embodiment

<System Configuration Diagram>

Figure 1:
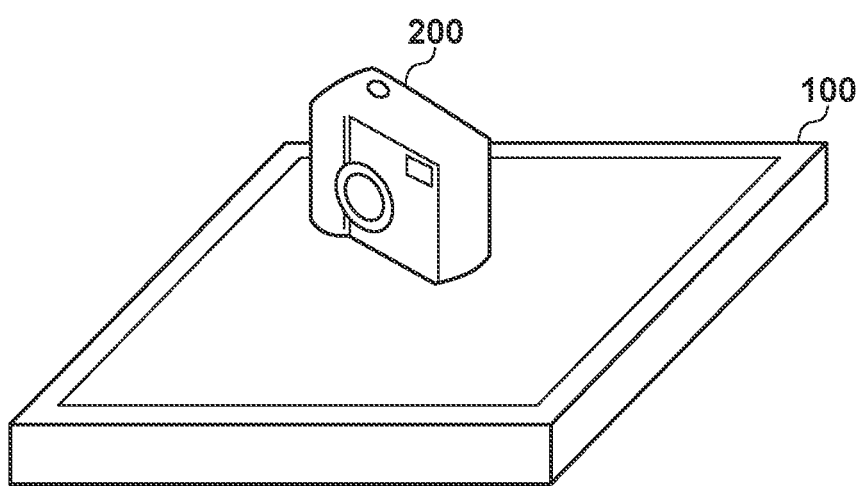
FIG. 1 is a diagram illustrating a system in an embodiment.
Figure 2:
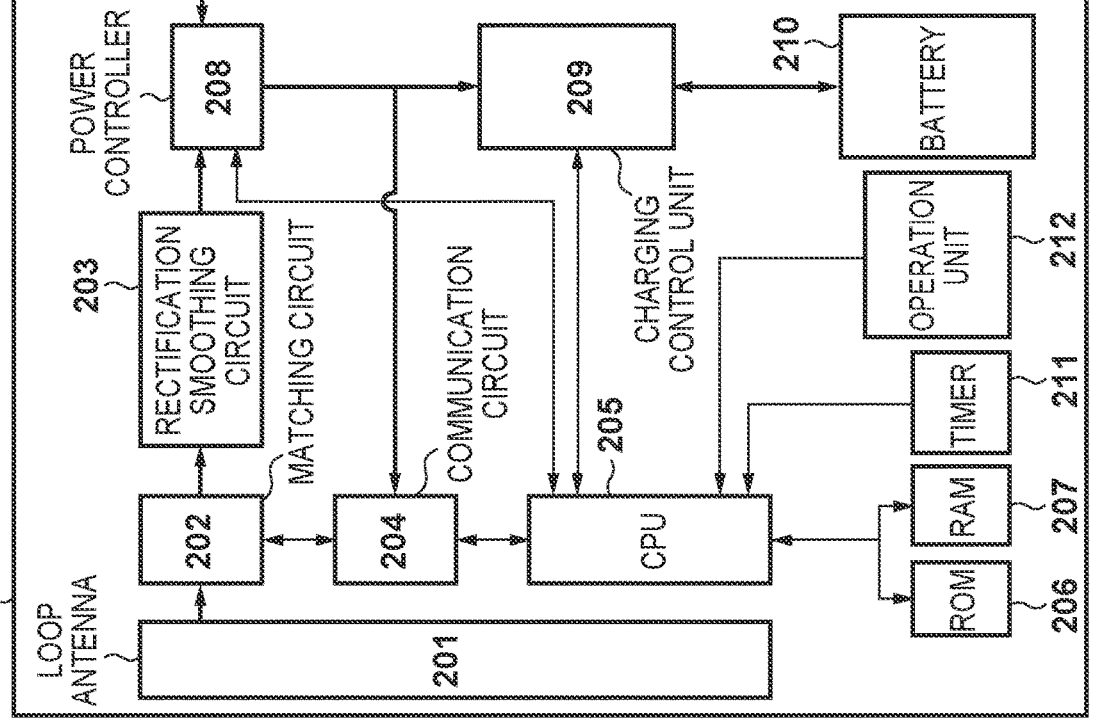
FIG. 2 is a block configuration diagram of the system of the embodiment.
Figure 2:
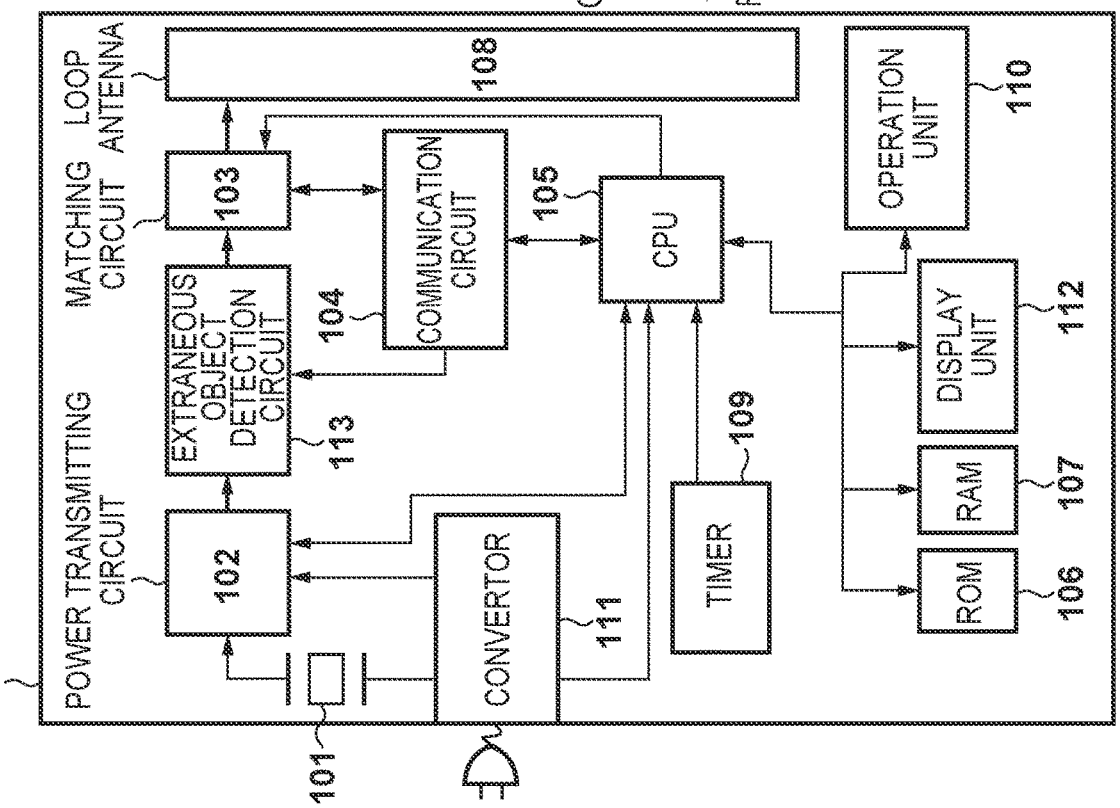

A power supply system according to a first embodiment includes a power supply apparatus 100 and an electronic device 200, as shown in FIG. 1, and NFC (Near Field Communication) communication is performed therebetween. Also, FIG. 2 shows block configuration diagrams of the power supply apparatus 100 and the electronic device 200.

When the electronic device 200 is placed on the power supply apparatus 100 in a wireless power transmission system in the first embodiment, as shown in FIG. 1, the power supply apparatus 100 wirelessly performs communication with and power supply to the electronic device 200 via an antenna 108. Also, if the distance between the power supply apparatus 100 and the electronic device 200 is in a given range, the electronic device 200 including an antenna 201 wirelessly receives power output from the power supply apparatus 100 via the antenna 201. Furthermore, the electronic device 200 charges a battery 210 attached to the electronic device 200 using power received from the power supply apparatus 100 via the antenna 201.

Also, if the distance between the power supply apparatus 100 and the electronic device 200 is not in the given range, the electronic device 200 cannot communicate with the power supply apparatus 100 even if the electronic device 200 includes the antenna 201. Note that the given range is a range in which the electronic device 200 can perform communication with power received from the power supply apparatus 100.

Note that it is assumed that the power supply apparatus 100 of the embodiment can wirelessly supply power to a plurality of electronic devices in parallel.

There are no limitations on the type of the electronic device 200 as long as the electronic device 200 is an electronic device that operates with power supplied from the battery 210. For example, the electronic device 200 may be an image sensing apparatus such as a smartphone, a digital still camera, a mobile phone with camera, or a digital video camera, or a reproduction apparatus such as a player that reproduces audio data and video data. Also, the electronic device 200 may be a moving apparatus such as an automobile that is driven with power supplied from the battery 210. Also, the electronic device 200 may be an electronic device that operates with power supplied from the power supply apparatus 100, when the battery 210 is not attached.

Next, the configurations of the power supply apparatus 100 and the electronic device 200 will be described in detail. As shown in FIG. 2, the power supply apparatus 100 includes an oscillator 101, a power transmitting circuit 102, a matching circuit 103, a communication circuit 104, a CPU 105, a ROM 106, a RAM 107, the antenna 108, a timer 109, an operation unit 110, a convertor 111, a display unit 112, and an extraneous object detection circuit 113.

The oscillator 101 is driven with power supplied from an AC power supply that is not illustrated via the convertor 111, and oscillates at a frequency that is to be used to control the power transmitting circuit 102. Note that the oscillator 101 uses a quartz oscillator or the like.

The power transmitting circuit 102 generates power to be supplied to the electronic device 200 via the antenna 108 with power supplied from the convertor 111 according to the oscillation frequency of the oscillator 101. The power transmitting circuit 102 includes an FET or the like therein, and generates power to be supplied to the electronic device 200 by controlling the gate voltage of the internal FET according to the oscillation frequency of the oscillator 101 in order to control a current flowing between source and drain terminals of the FET. Note that the power generated by the power transmitting circuit 102 is supplied to the matching circuit 103. Also, the power transmitting circuit 102 can stop power supply from the FET by controlling the gate voltage of the internal FET Also, the power to be generated by the power transmitting circuit 102 includes a first power and a second power.

The first power is power for communication for transmitting a request to the electronic device 200 in order for the power supply apparatus 100 to control the electronic device 200. The second power is power to be supplied to the electronic device 200 when the power supply apparatus 100 supplies power to the electronic device 200. For example, the first power is power in a range from 0.1 W to 1 W, the second power is power in a range from 2 W to 10 W. The first power is lower than the second power in this way.

Note that, when the power supply apparatus 100 supplies the first power to the electronic device 200, the power supply apparatus 100 can transmit the request to the electronic device 200 via the antenna 108. However, when the power supply apparatus 100 supplies the second power to the electronic device 200, the power supply apparatus 100 cannot transmit the request to the electronic device 200 via the antenna 108.

The CPU 105 controls the power transmitting circuit 102 so as to switch power to be supplied to the electronic device 200 to one of the first power, the second power, and power stoppage.

The matching circuit 103 is a resonant circuit for achieving resonance, according to the oscillation frequency of the oscillator 101, between the antenna 108 and a power receiving antenna included in an apparatus, which is selected by the CPU 105, to which power is to be supplied.

The CPU 105 sets the oscillation frequency of the oscillator 101 to a resonant frequency f. Note that the resonant frequency f is a frequency at which the power supply apparatus 100 achieves resonance with an apparatus to which the power supply apparatus 100 supplies power.

The frequency at which the power supply apparatus 100 achieves resonance with an apparatus to which the power supply apparatus 100 supplies power will be hereinafter referred to as a "resonant frequency f".

Equation (1) expresses the resonant frequency f. L denotes an inductance of the antenna 108, and C denotes a capacitance of the matching circuit 103.

[Math. 1]

$$f = \frac{1}{2\pi\sqrt{LC}} \quad (1)$$

Note that the resonant frequency f may be 50/60 Hz, which is a commercial frequency, 10 to several hundred kHz, or a frequency near 10 MHz.

In a state in which the oscillation frequency of the oscillator 101 is set to the resonant frequency f, the power generated by the power transmitting circuit 102 is supplied to the antenna 108 via the matching circuit 103.

The communication circuit 104 modulates power generated by the power transmitting circuit 102 in accordance with a predetermined protocol in order to transmit a request for controlling the electronic device 200 to the electronic device 200. The predetermined protocol is a communication protocol conformable to the ISO/IEC 18092 standard such as RFID (Radio Frequency IDentification), for example. Also, the predetermined protocol may be a communication protocol that conforms to the NFC (Near Field Communication) standard. The power generated by the power transmitting circuit 102 is converted to an analog signal serving as a request for performing communication with the electronic device 200 by the communication circuit 104, and the request is transmitted to the electronic device 200 via the antenna 108.

A pulse signal transmitted to the electronic device 200 is analyzed by the electronic device 200, and is detected as bit data including information "1" and information "0". Note that the request includes identification information for identifying the destination, a request code indicating the operation instructed by the request, and the like. Also, the CPU 105 can also transmit the request only to the electronic device 200 by controlling the communication circuit 104 so as to change the identification information included in the request. Also, the CPU 105 can also transmit the request to the electronic device 200 and an apparatus other than the electronic device 200 by controlling the communication circuit 104 so as to change the identification information included in the request.

The communication circuit 104 converts the power generated by the power transmitting circuit 102 to a pulse signal through ASK (Amplitude Shift Keying) modulation using an amplitude shift. The ASK modulation is a modulation that uses an amplitude shift, and is used in a communication between an IC card and a card reader that wirelessly communicates with the IC card, and the like.

The communication circuit 104 changes the amplitude of power generated by the power transmitting circuit 102 by switching analog multipliers and load resistors that are included in the communication circuit 104. With this, the communication circuit 104 converts the power generated by the power transmitting circuit 102 to a pulse signal. The pulse signal converted by the communication circuit 104 is supplied to the antenna 108, and is transmitted to the electronic device 200 as the request. Furthermore, the communication circuit 104 includes an encoding circuit that uses a given encoding method.

The communication circuit 104 can decode a response, from the electronic device 200, to the request transmitted to the electronic device 200 and information transmitted from the electronic device 200 using a decoding circuit, according to the change in current flowing in the antenna 108 detected by the matching circuit 103. With this, the communication circuit 104 can receive, from the electronic device 200, a response to the request transmitted to the electronic device 200 using the load modulation method and information transmitted from the electronic device 200. The communication circuit 104 transmits the request to the electronic device 200 according to the instruction from the CPU 105. Furthermore, the communication circuit 104, upon receiving a response or information from the electronic device 200, decodes the response or information, and supplies the decoded response or information to the CPU 105.

The communication circuit 104 includes a register for configuring settings for communication, and can adjust, under control of the CPU 105, the transmission intensity and reception sensitivity when communication is performed.

When an AC power supply that is not illustrated and the power supply apparatus 100 are connected, the CPU 105 controls the units of the power supply apparatus 100 with power supplied from the AC power supply via the convertor 111. Also, the CPU 105 controls operations of the units of the power supply apparatus 100 by executing a computer program stored in the ROM 106. The CPU 105 controls power to be supplied to the electronic device 200 by controlling the power transmitting circuit 102. Also, the CPU 105 transmits a request to the electronic device 200 by controlling the communication circuit 104.

The ROM 106 stores the computer program for controlling operations of the units of the power supply apparatus 100, and information such as parameters relating to the operations of the units. Also, the ROM 106 stores video data to be displayed in the display unit 112.

The RAM 107 is a rewritable volatile memory, and temporarily stores the computer program for controlling operations of the units of the power supply apparatus 100, information such as parameters relating to the operations of the units, and information from the electronic device 200 received by the communication circuit 104.

The antenna 108 is an antenna for outputting power generated by the power transmitting circuit 102 to the outside of the power supply apparatus 100.

The power supply apparatus 100 supplies power to the electronic device 200 or an NFC device 200a via the antenna 108, and transmits a request to the electronic device 200 via the antenna 108. Also, the power supply apparatus 100 receives, via the antenna 108, a request from the electronic device 200, a response to the request transmitted to the electronic device 200, and information transmitted from the electronic device 200.

The timer 109 measures current time and durations of operations and processing performed in the units of the power supply apparatus 100. Also, threshold values with respect to the durations measured by the timer 109 are stored in the ROM 106 in advance.

The operation unit 110 provides a user interface for operating the power supply apparatus 100. The operation unit 110 includes a power button of the power supply apparatus 100 and a mode switching button and the like of the power supply apparatus 100, and each button is constituted by a switch, a touch panel, or the like. The CPU 105 controls the power supply apparatus 100 in accordance with the instruction of a user made through the operation unit 110. Note that the operation unit 110 may be configured to control the power supply apparatus 100 according to a remote control signal received from a remote controller that is not illustrated.

When an AC power supply that is not illustrated and the power supply apparatus 100 are connected, the convertor 111 converts AC power supplied from the AC power supply that is not illustrated to DC power, and supplies the converted DC power to all of the units of the power supply apparatus 100.

The display unit 112 is a display unit that displays display contents generated by the CPU 105. The display unit 112 is constituted by a liquid crystal panel, an organic EL panel, or the like and a display control unit that controls the panel.

The extraneous object detection circuit 113 detects an output current value, a traveling wave amplitude voltage V1, and a reflected wave amplitude voltage V2, converts analog signals of the detected output current value, output voltage value, and reflected voltage to digital signals, and notifies the CPU 105 of the digital signals. The extraneous object detection circuit 113 is constituted by a directional coupler, for example. The extraneous object detection circuit 113 receives voltages respectively proportional to the amplitudes of a power traveling wave and a reflected wave from a power supply side loop antenna 108 through CM coupling, converts the voltages from analog values to digital values using an A/D (analog to digital) converter, and transmits the digital values to the CPU 105 as a detection signal. The CPU 105 obtains a voltage reflection coefficient ρ from the traveling wave amplitude voltage V1 and the reflected wave amplitude voltage V2. Also, the CPU 105 obtains a standing wave ratio VSWR (Voltage Standing Wave Ratio) from the obtained voltage reflection coefficient ρ. The more the standing wave ratio VSWR approaches 1, the smaller the reflected power is and the better the power efficiency is.

Here, the voltage reflection coefficient ρ is expressed by Equation (2).

[Math. 2]

$$\rho = \frac{V2}{V1} \tag{2}$$

Also, the standing wave ratio VSWR is expressed by Equation (3).

[Math. 3]

$$VSWR = \frac{1+\rho}{1-\rho} \quad (3)$$

The CPU 105 detects that an extraneous object other than the electronic device to which power is to be supplied has intruded into the communication zone of the antenna 108 when the VSWR value has suddenly changed.

Next, an exemplary configuration of the electronic device 200 will be described with reference to FIG. 2. Note that the electronic device 200 of the embodiment is a digital still camera, but this is merely an example, and there are no limitations on the type of the electronic device 200. Also, constituent elements relating to the camera are not illustrated in the diagram.

The electronic device 200 includes the antenna 201, a matching circuit 202, a rectification smoothing circuit 203, a communication circuit 204, a CPU 205, a ROM 206, a RAM 207, a power controller 208, a charging control unit 209, the battery 210, a timer 211, an operation unit 212, and an external power supply 213.

The antenna 201 is an antenna for receiving power supplied from the power supply apparatus 100. The electronic device 200 receives power from the power supply apparatus 100 via the antenna 201, and receives a request. Also, the electronic device 200 transmits a request for controlling the power supply apparatus 100, a response to the request received from the power supply apparatus 100, and given information via the antenna 201.

The matching circuit 202 is a resonant circuit that performs impedance matching so that the antenna 201 resonates at the same frequency as the resonant frequency f of the power supply apparatus 100. The matching circuit 202 includes a capacitor, a coil, a resistor, and the like, similarly to the matching circuit 103. The matching circuit 202 causes the antenna 201 to resonate at the same frequency as the resonant frequency f of the power supply apparatus 100. Also, the matching circuit 202 supplies the power received by the antenna 201 to the rectification smoothing circuit 203. The matching circuit 202 supplies some power received by the antenna 201 to the communication circuit 204 in an AC waveform as is, as a request.

The rectification smoothing circuit 203 removes the request and noise from the power received by the antenna 201, and generates DC power. Also, the rectification smoothing circuit 203 supplies the generated DC power to the power controller 208. Note that the rectification smoothing circuit 203 includes a rectification diode, and generate DC power through one of full-wave rectification and half-wave rectification. The DC power generated by the rectification smoothing circuit 203 is supplied to the power controller 208.

The communication circuit 204 analyzes the request supplied from the matching circuit 202 according to the power supply apparatus 100 and a predetermined communication protocol, and supplies the result of analyzing the request to the CPU 205.

The CPU 205 controls the communication circuit 204 so as to turn on/off a load such as a resistor included in the communication circuit 204 in order to transmit a response to the request and given information to the power supply apparatus 100 in a form of a load modulation signal, and communication from the power supply apparatus 100 to the electronic device 200 is performed. When the load included in the communication circuit 204 is changed, the current flowing through the antenna 108 changes. Accordingly, the power supply apparatus 100 receives a request, a response to a request, and given information that have been transmitted from the electronic device 200 by detecting the change in the current flowing in the antenna 108.

The communication circuit 204 converts power supplied from the power controller 208 to a pulse signal through ASK modulation using an amplitude shift, similarly to the communication circuit 104, and outputs the pulse signal via the matching circuit 202 and the power receiving side loop antenna 201. Also, a load modulation signal, which is a response to an ASK modulation signal that has been transmitted, can be received via the power receiving side loop antenna 201 and the matching circuit 202.

The CPU 205 determines which of the requests is the request received by the communication circuit 204 according to the analysis result supplied from the communication circuit 204, and controls the electronic device 200 to perform the processing or operation designated by a request code corresponding to the received request.

The CPU 205 returns responses to a request for device authentication and a request for acquiring charging information from the power supply apparatus via the communication circuit 204.

Also, the CPU 205 controls operations of the units of the electronic device 200 by executing computer programs stored in the ROM 206. The ROM 206 stores the computer programs for controlling operations of the units of the electronic device 200 and information such as parameters relating to the operations of the units. Also, the ROM 206 stores identification information of the electronic device 200 and the like. The identification information of the electronic device 200 is information indicating the ID of the electronic device 200, and also includes the manufacturer name of the electronic device 200, the apparatus name of the electronic device 200, the date of manufacture of the electronic device 200, and the like.

The RAM 207 is a rewritable volatile memory, and temporarily stores the computer program for controlling operations of the units of the electronic device 200, information such as parameters relating to the operations of the units, and information received from the power supply apparatus 100.

The power controller 208 is constituted by a switching regulator or a linear regulator, and supplies DC power supplied from one of the rectification smoothing circuit 203 and the external power supply 213 to all of the units of the electronic device 200 including the charging control unit 209.

The charging control unit 209 charges the battery 210 according to the supplied power, when power is supplied from the power controller 208. Note that the charging control unit 209 is assumed to charge the battery 210 using a constant voltage/constant current method. Also, the charging control unit 209 regularly detects information regarding charging of the attached battery 210, and supplies the information to the CPU 205. Note that the information regarding charging of the battery 210 will be hereinafter referred to as "charging information".

The CPU 205 stores the charging information in the RAM 207. Note that the charging information may include, other than remaining capacity information indicating the remaining capacity of the battery 210, information indicating whether or not the battery 210 is fully charged, and may include information indicating the time elapsed from when charging of the battery 210 by the charging control unit 209 was started. Also, the charging information may include information indicating that the charging control unit 209 charges the battery 210 in accordance with constant voltage control, information indicating that the charging control unit 209 charges the battery 210 in accordance with constant current control, or the like. Also, the charging information includes information indicating that the charging control unit 209 is performing software charging control and trickle charging on the battery 210, information indicating that the charging control unit 209 is performing quick charging on the battery 210, or the like. Also, the charging information includes information regarding power needed by the electronic device 200 to charge the battery 210, and information indicating whether or not the battery 210 is in a dangerous temperature state. The charging information includes information indicating how much battery capacity is needed to cause the power receiving apparatus 200 to operate. Furthermore, the charging information includes information indicating how much battery capacity decreases by discharging when the power from the power supply apparatus is stopped, and information regarding wear of the battery 210 such as how many times charging and discharging of the battery 210 has been repeated.

The battery 210 is a battery that can be attached to and detached from the electronic device 200. Also, the battery 210 is a rechargeable secondary battery, and is a lithium-ion battery or the like, for example. The battery 210 can supply power to the units of the electronic device 200. The battery 210 supplies power to the units of the electronic device 200 when power is not supplied via the power controller 208. For example, when the power supply apparatus outputs the first power for communication that has been set to a low level, and when power supply from the power supply apparatus is stopped, the battery 210 supplies power to the units of the electronic device 200.

The timer 211 measures current time and durations of operations and processing performed in the units of the electronic device 200. Also, threshold values with respect to the durations measured by the timer 211 are stored in the ROM 206 in advance.

The operation unit 212 provides a user interface for operating the electronic device 200. The operation unit 212 includes a power button for operating the electronic device 200 and a mode switching button for switching the operation mode of the electronic device 200 and the like, and each button is constituted by a switch, a touch panel, or the like. The CPU 205 controls the electronic device 200 in accordance with the instruction of a user made through the operation unit 212. Note that the operation unit 212 may be configured to control the electronic device 200 according to a remote control signal received from a remote controller that is not illustrated.

The external power supply 213 is a power supply that converts AC of an AC power supply to DC and supplies the DC to the electronic device 200.

Note that the antennas 108 and 201 may be a helical antenna, a loop antenna, or a planar antenna such as a meander line antenna.

Also, the processing performed by the power supply apparatus 100, in the first embodiment, can be applied to a system in which the power supply apparatus 100 wirelessly supplies power to the electronic device 200 through electromagnetic field coupling. Similarly, the processing performed by the electronic device 200, in the first embodiment, can be applied to a system in which the power supply apparatus 100 wirelessly supplies power to the electronic device 200 through electromagnetic field coupling.

Also, by providing electrodes respectively in the power supply apparatus 100 and the electronic device 200 as the antennas 108 and 201, the present invention can be applied to a system in which the power supply apparatus 100 supplies power to the electronic device 200 through electric field coupling.

Also, the processing performed by the power supply apparatus 100 and the processing performed by the electronic device 200 can also be applied to a system in which the power supply apparatus 100 wirelessly supplies power to the electronic device 200 through electromagnetic induction.

Also, in the first embodiment, the power supply apparatus 100 wirelessly transmits power to the electronic device 200, and the electronic device 200 wirelessly receives power from the power supply apparatus 100. However, "wirelessly" can be rephrased as "contactlessly" or "without contact".

<Overall Processing of Power Supply Apparatus 100>

Figure 3A:
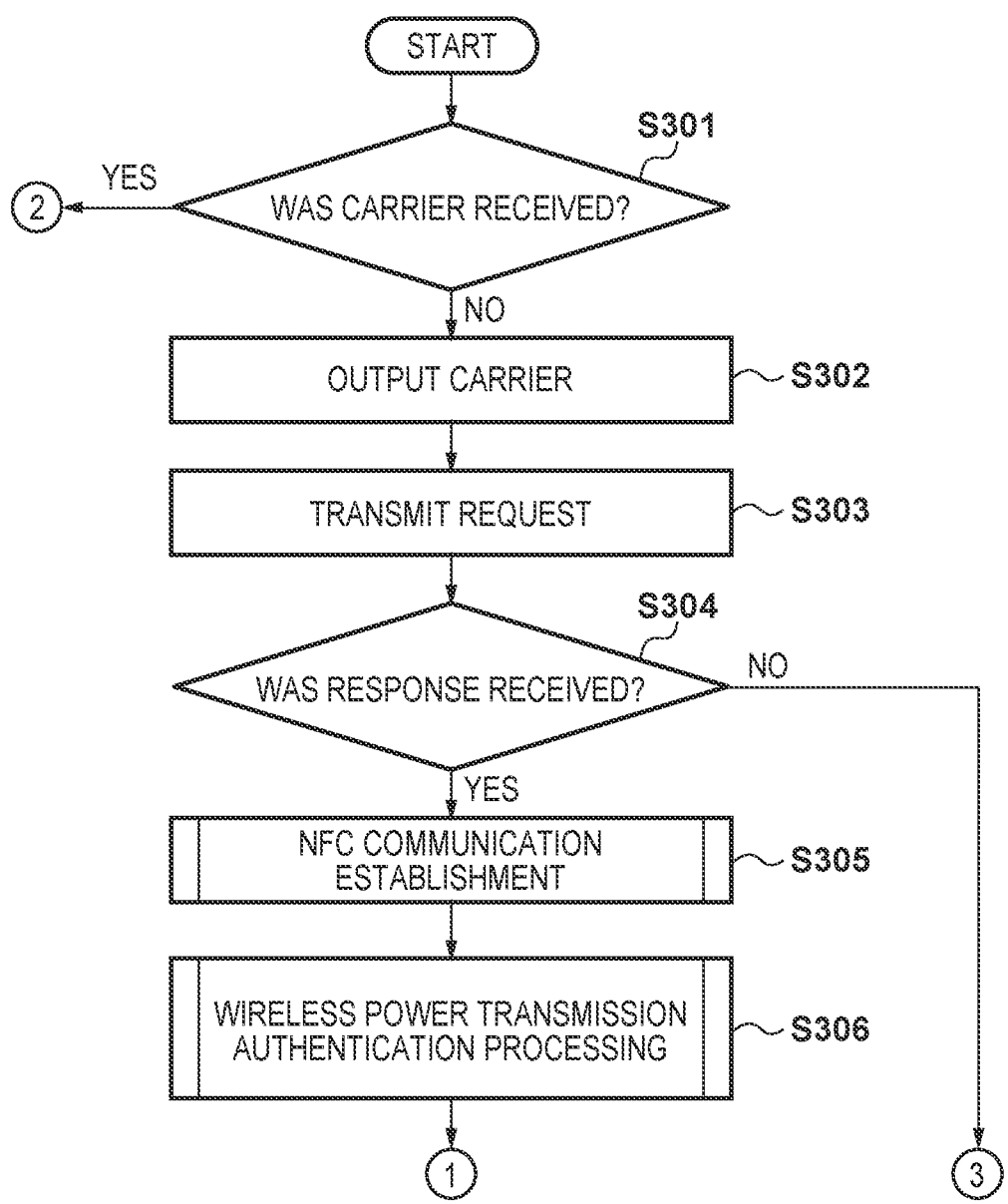
FIGS. 3A and 3B are flowcharts illustrating overall processing of a power supply apparatus of the embodiment.
Figure 3B:
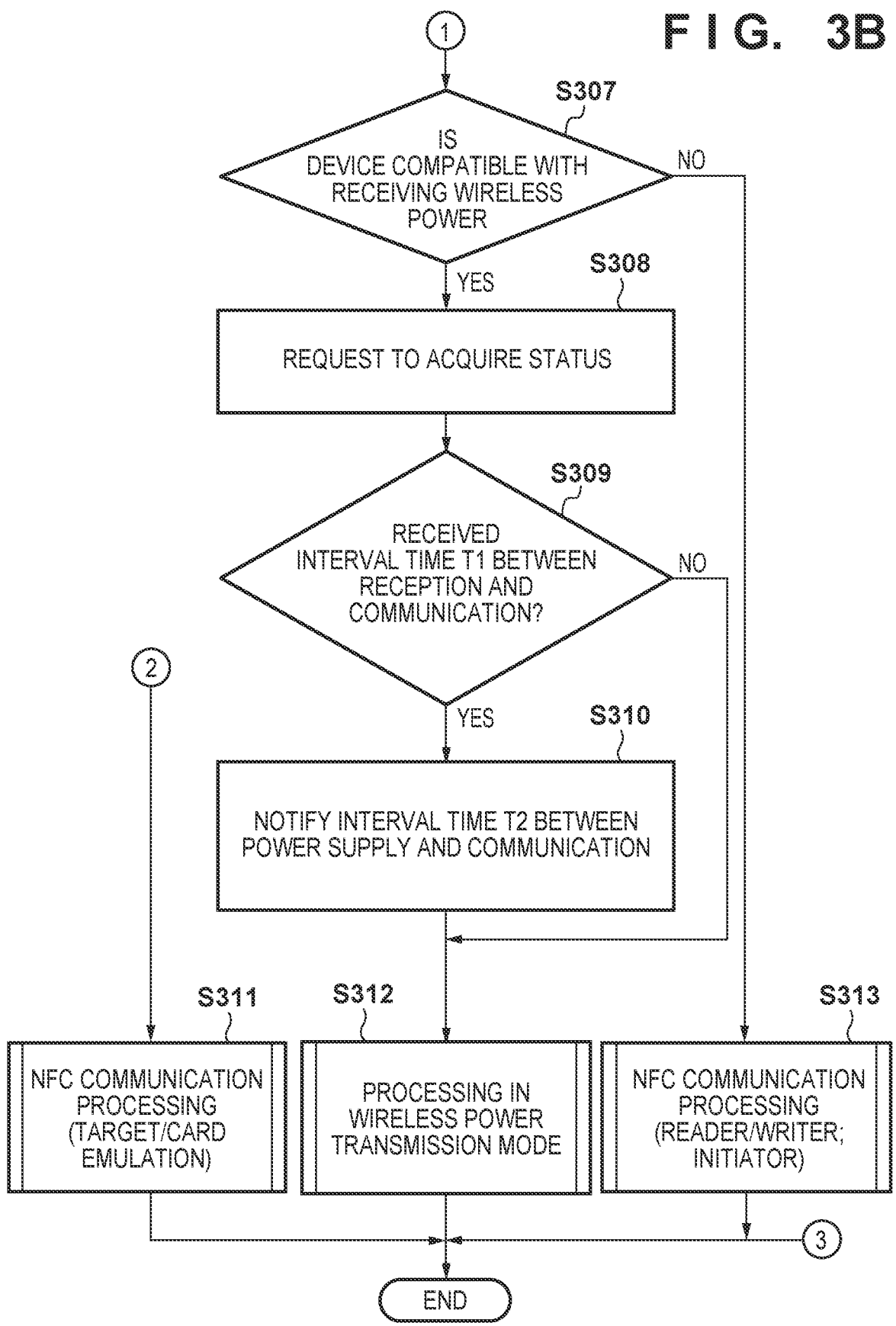

FIGS. 3A and 3B show flowcharts illustrating processing procedures of the power supply apparatus 100 of the first embodiment. Note that the control program corresponding to this flowchart is stored in the ROM 106 in advance, and, in a state where the power supply apparatus 100 is powered on, the CPU 105 extracts the program stored in the ROM 106 to the RAM 107 and executes the program. The control program of this flowchart may be configured to regularly repeat execution of the processing.

In S301, the CPU 105 determines whether or not the communication circuit 104 has received an electromagnetic field (hereinafter referred to as a carrier) emitted from the electronic device 200 at a given frequency via the antenna 108 and the matching circuit 103. For example, in the case of NFC, the carrier is a carrier signal having a frequency of 13.56 MHz. If determined that the carrier has been received (Yes in S301), the CPU 105 advances the processing from S301 to S311. On the other hand, if determined that the carrier has not been received (No in S301), the CPU 105 advances the processing from S301 to S302.

In S302, the CPU 105 outputs the first power by controlling the power transmitting circuit 102. For example, the CPU 105 outputs power, as the first power, with which at least the communication circuit 204 of the electronic device 200 can operate without receiving power from the battery 210. The CPU 105, upon outputting the first power, advances the processing from S302 to S303. In S303, the CPU 105 transmits a request for detecting the electronic device 200 by controlling the communication circuit 104 so as to modulate the first power being output. For example, when inquiring about whether or not an NFC compatible device is present, a SENS_REQ request in the case of TypeA, a SENSB_REQ request in the case of TypeB, or a SENSF_REQ request in the case of TypeF is transmitted. The CPU 105, upon transmitting the first power and the request subsequently, advances the processing from S303 to S304.

In S304, the CPU 105 determines whether or not a response signal from the electronic device 200 with respect to the request has been received via the communication circuit 104. For example, if the electronic device 200 is an NFC compatible device, the power supply apparatus 100 receives a SENS_RES response as a response to TypeA, a SENSB_RES response as a response to TypeB, or a SENSF_RES response as a response to TypeF. If the CPU 105 has received any of the responses, the CPU 105 determines that the electronic device 200 is present, and advances the processing from S304 to S305. On the other hand, if determined that a response signal from the electronic device 200 cannot be received, the CPU 105 ends the processing of the flowchart in S304.

In S305, the CPU 105 performs NFC communication establishment processing with the electronic device 200 by controlling the communication circuit 104. The NFC communication establishment processing in the embodiment is assumed to be the same as the authentication processing defined in the NFC standard. Also, because this is the first authentication of the electronic device 200, the CPU 105 stores the information indicating the communication mode established in the NFC communication establishment processing in the RAM 107. The CPU 105, upon completing the NFC communication establishment processing, advances the processing from S305 to S306.

In S306, the CPU 105 performs authentication processing of the wireless power transmission by controlling the communication circuit 104. Specifically, various types of information (compatibility with wireless power transmission, power that can be handled, battery level, whether or not a battery is present, etc.) for wireless power transmission in a format of NDEF (NFC Data Exchange Format) are exchanged. The CPU 105 stores the NDEF information for wireless power transmission received by the communication circuit 104 in the RAM 107. The CPU 105, upon completing this processing, causes the processing in the flowchart to transition from S306 to S307.

In S307, the CPU 105 determines, from the NDEF information that has been received in S306 and stored in the RAM 107, whether or not the electronic device 200, which is the communication partner, is a device compatible with wireless power transmission. For example, if the electronic device 200 includes a rechargeable battery, the electronic device 200 is determined to be a device compatible with the wireless power transmission. Alternatively, if the electronic device 200 is a device including an auxiliary power supply such as a super capacitor, the electronic device 200 is determined to be a device compatible with the wireless power transmission. The CPU 105, upon determining that the electronic device 200 is compatible with wireless power transmission (Yes in S307), advances the processing from S307 to S308. Also, the CPU 105, upon determining that the electronic device 200 is not compatible with wireless power transmission (No in S307), advances the processing from S307 to S313.

In S308, the CPU 105 transmits a request for acquiring an interval time T1 from when a second power, which is power for wireless power transmission, has been received until when the first power is received from the electronic device 200 via the communication circuit 104. Then, the CPU 105 advances the processing to the next S309.

In S309, the CPU 105 controls the communication circuit 104 and determines whether or not a response to the request for the interval time T1 has been received from the electronic device 200. If the CPU 105 has received a response of the interval time T1 (Yes in S309), the CPU 105 advances the processing from S309 to S310. Also, if the CPU 105 has not received a response of the interval time T1 (No in S309), the CPU 105 advances the processing from S309 to S312. Note that, if the CPU 105 has not received a response of the interval time T1 (No in S309), the CPU 105 sets an interval time Tp from when the second power, which is power for wireless power transmission, has been output until when the first power is output to a pre-set interval time T2.

In S310, the CPU 105 compares the interval time T1 acquired from the electronic device 200 with the interval time Tp from when the second power, which is power for wireless power transmission, has been output until when the first power is output, the interval time Tp being stored in the RAM 107 in advance. The CPU 105 compares T1 with Tp, and sets the smaller interval time as the interval time T2. Then, in S310, the CPU 105 notifies, by controlling the communication circuit 104, the electronic device 200 of the interval time T2 determined by comparing the interval times of the electronic device 200 and the power supply apparatus 100. Then, the CPU 105 advances the processing from S310 to S312.

Note that the order of processing performed in S309 and S310 may be reversed, and the interval time may be determined on the electronic device 200 side.

In S311, the CPU 105 operates as a target in the NFC peer mode or in the card emulation mode, and performs given NFC processing. For example, the CPU 105 performs processing in which, upon receiving URI information transmitted from the partner device, a browser is launched for accessing a server, credit card payment processing for electronic money, and the like. Then, the CPU 105 ends processing in this flowchart at S311.

In S312, the CPU 105 performs processing in wireless power transmission. The processing in S312 will be described in detail later using FIGS. 4A and 4B. Then, the CPU 105 ends processing in this flowchart in S311.

In S313, the CPU 105 operates using an initiator communication method in the NFC peer mode, or in the reader/writer mode, and performs desired NFC processing. For example, if the partner device is an electronic money NFC card, the CPU 105 performs payment processing or the like in the reader/writer mode, and if the partner device is a smartphone, the CPU 105 transmits data such as a URI as the initiator communication method in the peer mode. Then, the CPU 105 ends processing in this flowchart at S311.

<Power Supply Processing of Power Supply Apparatus 100>

Figure 4A:
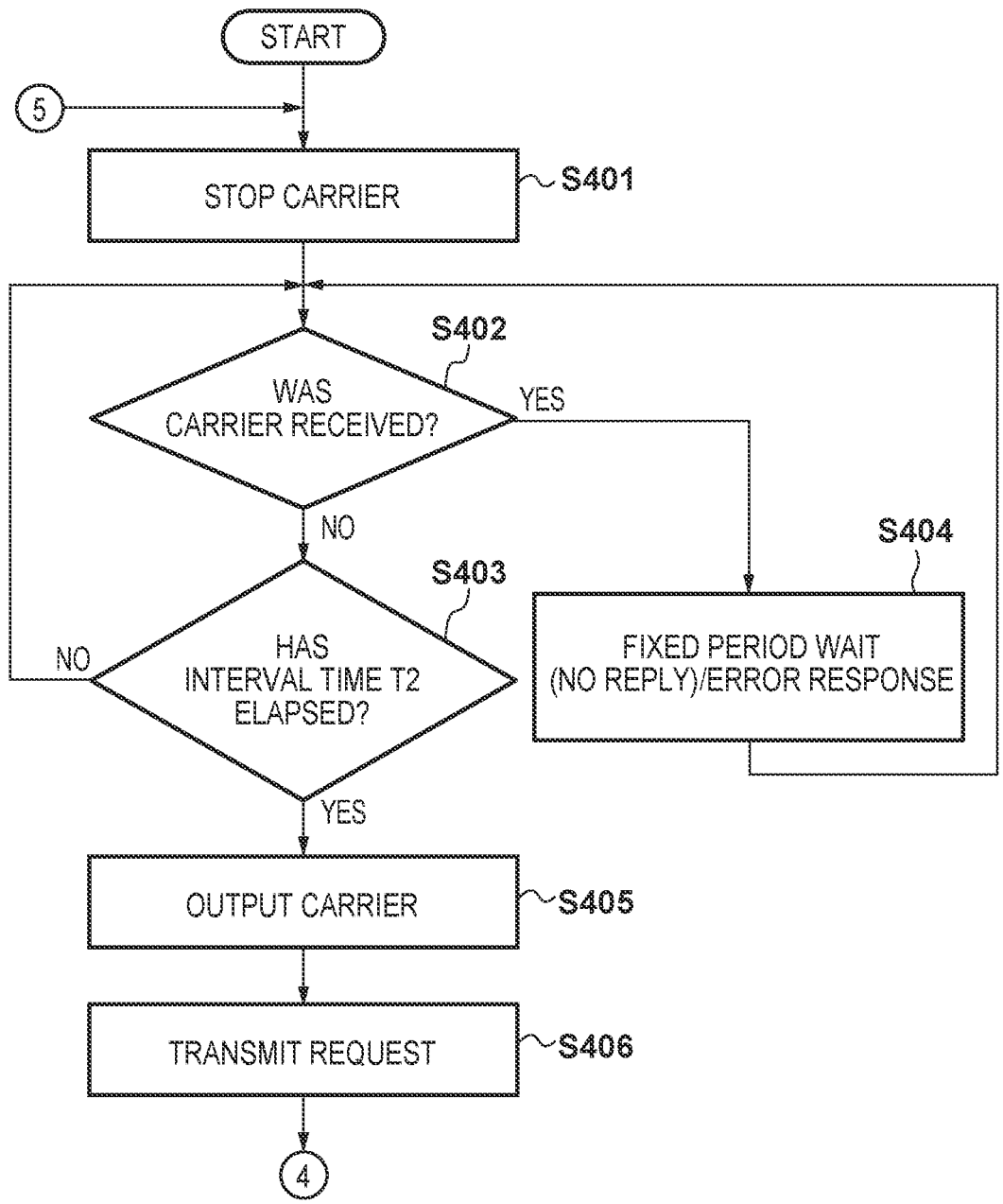
FIGS. 4A and 4B are flowcharts illustrating power supply processing of the power supply apparatus of the embodiment.
Figure 4B:
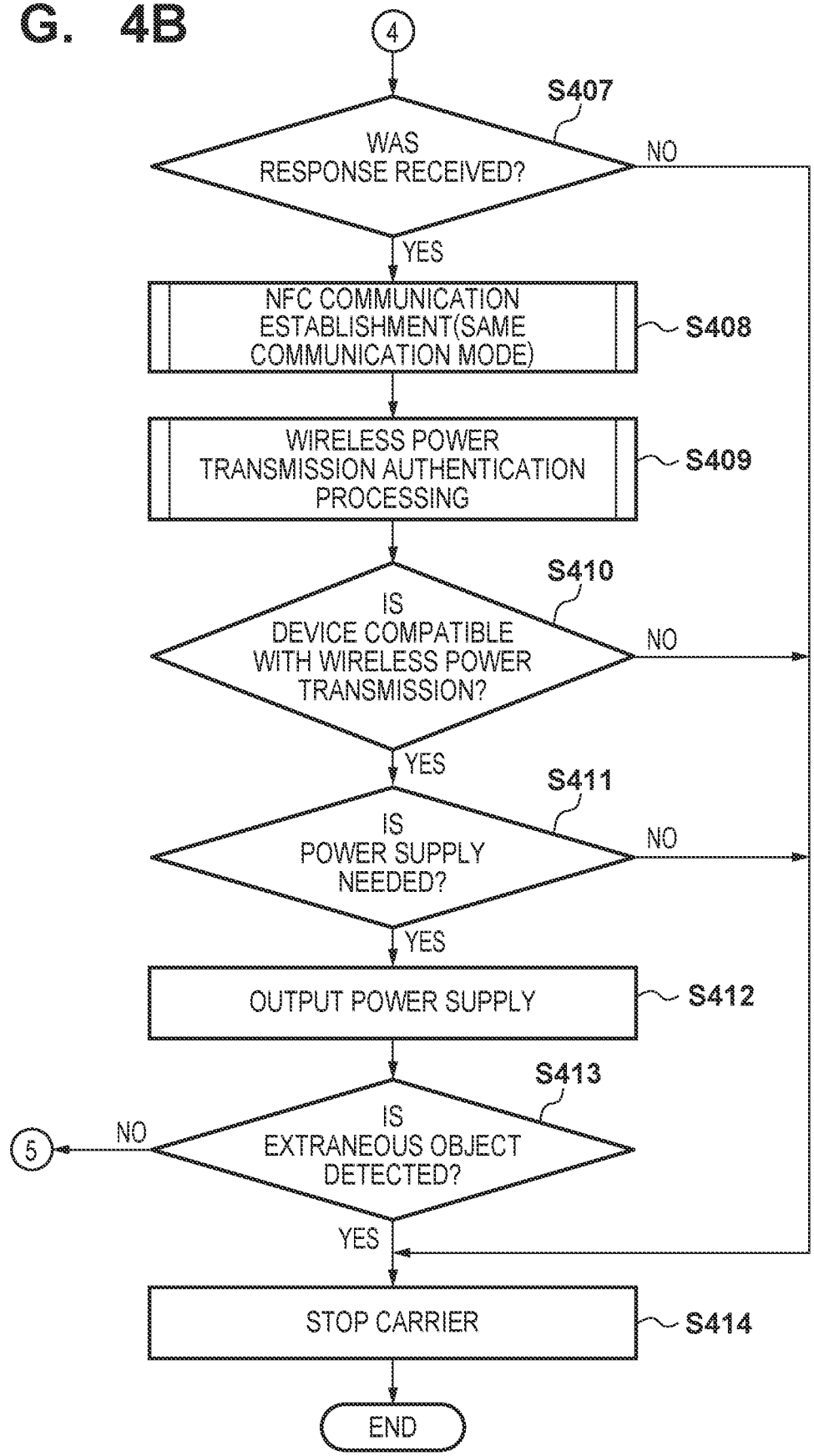

FIGS. 4A and 4B show flowcharts illustrating an example of power supply processing (second or re-authentication processing) in the power supply apparatus 100 of the present embodiment. Note that the control program of this flowchart is stored in the ROM 106 in advance. Also, in a state where the power supply apparatus 100 is powered on, the CPU 105 extracts the program stored in the ROM 106 to the RAM 107 and executes the program. The control program of this flowchart may be configured to regularly repeat execution of the processing.

In S401, the CPU 105 stops outputting the carrier by controlling the power transmitting circuit 102. The CPU 105, upon stopping outputting the carrier, advances the processing from S401 to S402.

In S402, the CPU 105 determines whether or not a carrier has been received during the interval T2 via the communication circuit 104. If determined that a carrier has been received (Yes in S402), the CPU 105 advances the processing from S402 to S404. On the other hand, if determined that a carrier has not been received (No in S402), the CPU 105 advances the processing from S402 to S403.

In S403, the CPU 105 counts the interval time T2 determined in S310 using the timer 109, and determines whether or not the interval time T2 has elapsed. If determined that the interval time T2 has elapsed (Yes in S403), the CPU 105 advances the processing from S403 to S405. On the other hand, if determined that the interval time T2 has not elapsed (No in S403), the CPU 105 returns the processing from S403 to S402.

In S404, the CPU 105 controls the communication circuit 104 so as to not reply to the carrier or request received from the electronic device 200, or return an error response. The CPU 105, upon completing the processing in S404, returns the processing from S404 to S402.

As can be understood from the above description, the CPU 105 does not advance the processing in a period indicated by the interval timer time T2 from the start of this processing by not replying to the carrier from an external device or returning an error response.

In S405, the CPU 105 outputs the first power by controlling the power transmitting circuit 102. For example, the CPU 105 outputs power, as the first power, with which at least the communication circuit 204 of the electronic device 200 can operate without receiving power from the battery 210. The CPU 105, upon outputting the first power, advances the processing from S405 to S406.

In S406, the CPU 105 transmits a request for detecting the electronic device 200 by controlling the communication circuit 104 so as to modulate the first power being output. For example, when inquiring about whether or not an NFC compatible device is present, a SENS_REQ request in the case of TypeA, a SENSB_REQ request in the case of TypeB, or a SENSF_REQ request in the case of TypeF is transmitted. The CPU 105, upon transmitting the first power, advances the processing from S406 to S407.

In S407, the CPU 105 determines whether or not a response signal from the electronic device 200 with respect to the request has been received via the communication circuit 104. For example, if the electronic device 200 is an NFC compatible device, the power supply apparatus 100 receives a SENS_RES response as a response to TypeA, a SENSB_RES response as a response to TypeB, or a SENS-F_RES response as a response to TypeF. If the CPU 105 could receive the response signal from the electronic device 200 (Yes in S407), the CPU 105 advances the processing from S407 to S408. Also, if the CPU 105 could not receive the response signal from the electronic device 200 (No in S407), the CPU 105 advances the processing from S407 to S414.

In S408, the CPU 105 performs the NFC communication establishment processing with the electric device 200 by controlling the communication circuit 104. The authentication processing defined in the NFC standard is performed as the NFC communication establishment processing. Here, the CPU 105 acquires the communication mode that has been determined in S306 and stored in the RAM 107 from the RAM 107, and selects the same communication mode. The CPU 105, upon completing the NFC communication establishment processing, advances the processing from S408 to S409.

In S409, the CPU 105 performs authentication processing of the wireless power transmission by controlling the communication circuit 104. The CPU 105 transmits and receives various types of information (compatibility with wireless power transmission, power that can be handled, battery level, whether or not a battery is present, power needed, etc.) for wireless power transmission in a format of NDEF. Note that, if determined that, as a result of exchanging various types of information, power supply is not possible, the CPU 105 notifies, by controlling the communication controller 104, the electronic device 200 of the notification that power transmission is to be terminated. The CPU 105 stores the NDEF information of the wireless power transmission received by the communication circuit 104 in the RAM 107. The CPU 105, upon completing this processing, causes the processing to transition from S409 to S410.

In S410, the CPU 105 determines, based on the NDEF information that has been received in S409 and stored in the RAM 107, whether or not the electronic device 200, which is the communication partner, is a device compatible with wireless power transmission. If determined that the partner device is compatible with wireless power transmission (Yes in S410), the CPU 105 advances the processing from S410 to S411. On the other hand, if determined that the partner device is not compatible with wireless power transmission (No in S410), the CPU 105 advances the processing from S410 to S414.

In S411, the CPU 105 determines whether or not power supply is possible based on information such as whether or not a battery is present and the battery level from various types of information regarding wireless power transmission in a format of NDEF that have been received in S410. If determined that power supply is possible because the battery level indicates a non-fully charged state or the like (Yes in S411), the CPU 105 advances the processing from S411 to S412. Also, if determined that power supply is not possible, or the battery level indicates a fully charged state (No in S411), the CPU 105 advances the processing from S411 to S414.

In S412, the CPU 105 outputs the second power by controlling the power transmitting circuit 102. The CPU 105 determines power to be output based on necessary power information out of various types of information regarding wireless power transmission in the NDEF format that have been received in S410, and outputs the determined power by controlling the power transmitting circuit 102. The CPU 105, upon outputting the second power, advances the processing from S412 to S413.

In S413, the CPU 105 controls the extraneous object detection circuit 113, and determines whether or not an extraneous object is present. Note that, as the extraneous object here, devices such as an NFC card, an NFC tag, and a smartphone, a metal object, and the like are envisioned. If determined that an extraneous object is present (Yes in S413), the CPU 105 advances the processing from S413 to S414. If determined that no extraneous object is present (No in S413), the CPU 105 returns the processing from S413 to S401.

In S414, the CPU 105 stops outputting the carrier by controlling the power transmitting circuit 102. The CPU 105, after stopping outputting the carrier, ends processing of this flowchart.

Although a configuration has been described in which the power supply apparatus 100 outputs a carrier in the reader/writer mode, or as an initiator in the peer mode, in the processing of the power supply apparatus 100 described above, it is also possible that the power supply apparatus 100 performs power supply processing while operating in the card emulation mode or using the target communication method in the peer mode, by receiving the carrier. Note that even in a case where the power supply apparatus 100 operates in the card emulation mode or uses the target communication method in the peer mode, the same mode can be selected in the power supply processing.

<Overall Processing of Electronic Device 200>

Figure 5A:
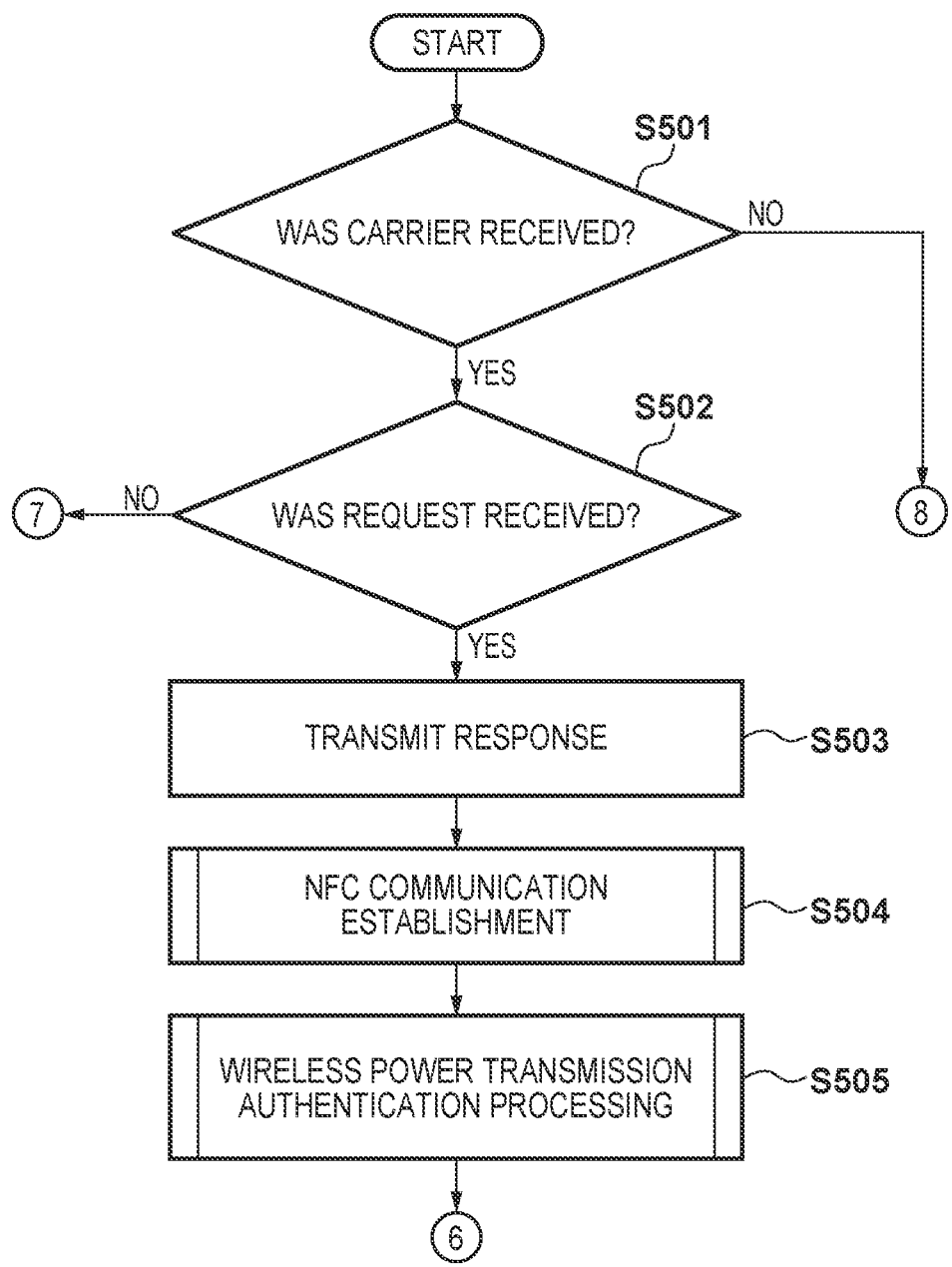
FIGS. 5A and 5B are flowcharts illustrating overall processing of an electronic device of the embodiment.
Figure 5B:
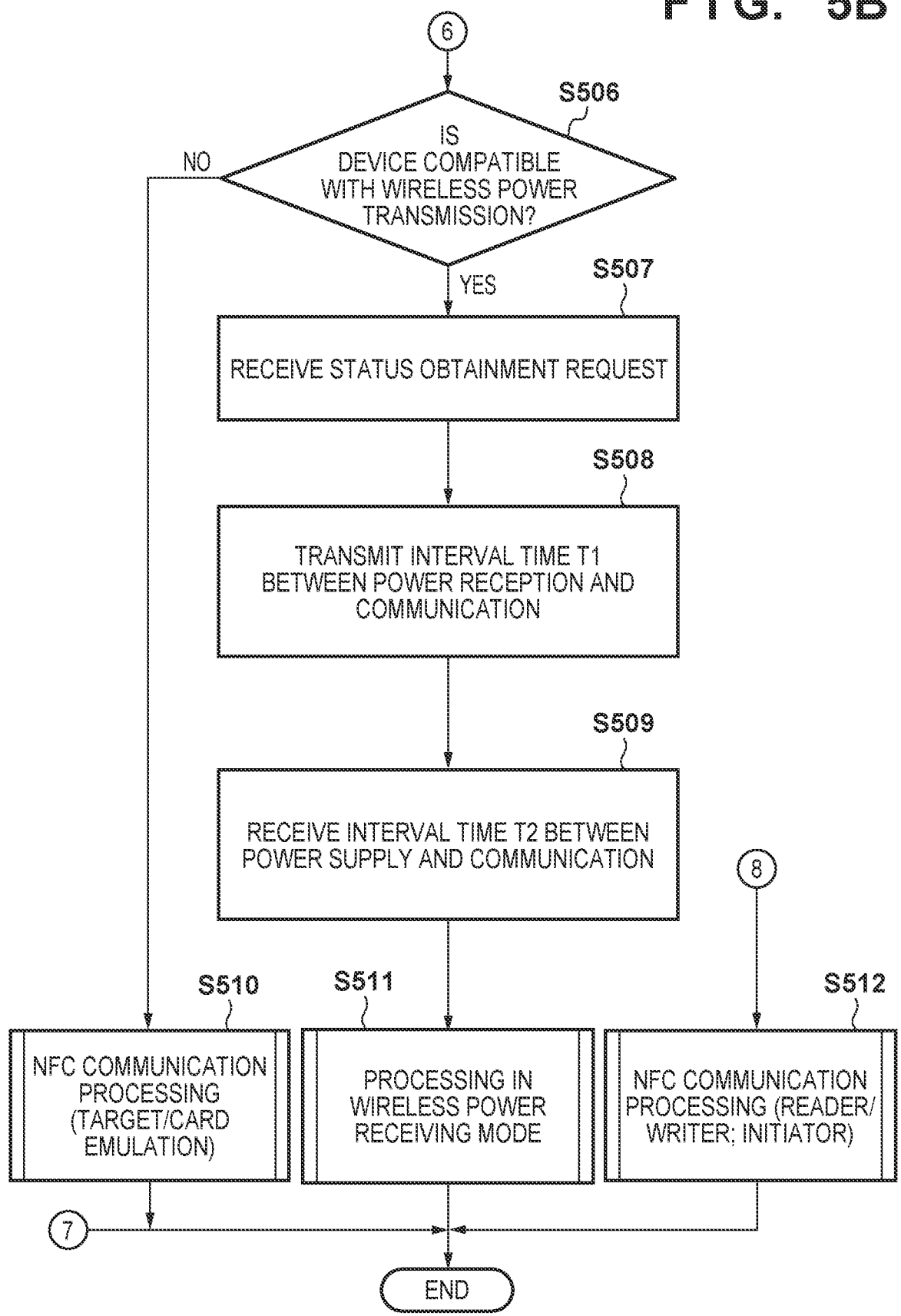

FIGS. 5A and 5B show a flowchart illustrating processing procedures of the electronic device 200 of the present embodiment. The control program of this flowchart is stored in the ROM 206. Upon the electronic device 200 being powered on, the CPU 205 extracts the program stored in the ROM 206 to the RAM 207, and executes the program. The control program of this flowchart may be configured to regularly repeat execution of the processing.

In S501, the CPU 205 controls the communication circuit, and determines whether or not a carrier signal that is input via the antenna 201 and the matching circuit 202 has been received. If determined that the carrier has been received (Yes in S501), the CPU 205 advances the processing from S501 to S502. Also, if determined that the carrier has not been received (No in S501), the CPU 205 advances the processing from S501 to S512.

In S502, the CPU 205 controls the communication circuit 204, and determines whether or not a modulation signal superimposed on the received carrier signal has been received. For example, the electronic device 200 receives a request such as the SENS_REQ request of TypeA in the NFC standard, the SENSB_REQ request of TypeB, or the SENSF_REQ request of TypeF. If determined that any of the requests were received (Yes in S502), the CPU 205 advances the processing from S502 to S503. Also, if determined that no request was received (No in S502), the CPU 205 ends processing of this flowchart.

In S503, the CPU 205 returns, by controlling the communication circuit 204, the SENS_RES response in the case of TypeA as the response, the SENSB_RES response in the case of TypeB as the response, the SENSF_RES response in the case of TypeF as the response through load modulation. Then, the CPU 205 advances the processing from S503 to S504.

In S504, the CPU 205 performs NFC communication establishment processing with the power supply apparatus 100 by controlling the communication circuit 204. The CPU 205 stores the information indicating the communication mode established in the NFC communication establishment processing in the RAM 207. The authentication processing defined in the NFC standard is performed as the NFC communication establishment processing. The CPU 205, upon completing the NFC communication establishment processing, advances the processing from S504 to S505.

In S505, the CPU 205 performs authentication processing of the wireless power transmission by controlling the communication circuit 204. Specifically, various types of information (compatibility with wireless power transmission, power that can be handled, battery level, whether or not a battery is present, etc.) for wireless power transmission in the NDEF format are exchanged. Upon completing this processing, the CPU 205 causes the processing to transition from S505 to S506.

In S506, the CPU 205 determines, from the NDEF information transmitted from the power supply apparatus 100, whether or not the power supply apparatus 100 is a device compatible with wireless power transmission. For example, if the power supply apparatus 100 is capable of supplying power with which the battery of the electronic device can be recharged, the CPU 205 determines that this power supply apparatus 100 is a device compatible with wireless power transmission. If determined that the power supply apparatus 100, which is a partner device, is compatible with wireless power transmission (Yes in S506), the CPU 205 advances the processing from S506 to S507. If determined that the partner device is not compatible with wireless power transmission (No in S506), the CPU 105 advances the processing from S506 to S510.

In S507, the CPU 205 receives a request for acquiring the interval time T1 from when the second power, which is power for wireless power transmission, has been received until when the first power is received, from the power supply apparatus 100 via the communication circuit 204. Then, the CPU 205 advances the processing from S507 to S508.

In S508, the CPU 205 returns, by controlling the communication circuit 204, the interval time T1 held in the RAM 207 as response information. Then, the CPU 205 advances the processing from S508 to S509.

In S509, the CPU 205 receives, by controlling the communication circuit 204, the interval time T2 that has been determined by comparing the interval times of the electronic device 200 and the power supply apparatus 100 and transmitted from the power supply apparatus 100, and stores the interval time T2 in the RAM 207. The CPU 205 advances the processing in this flowchart from S509 to S511.

In S510, the CPU 205 operates as a target in the NFC peer mode, or in the card emulation mode, and performs desired NFC processing. For example, the CPU 205 performs processing in which, upon receiving an URI information transmitted from the partner device, a browser is launched for accessing a server, credit card payment processing for electronic money, and the like. The CPU 205 ends the processing in this flowchart in S510.

In S511, the CPU 205 performs power receiving processing in the wireless power transmission. The processing in S511 will be described in detail later using FIG. 6. Then, the CPU 205 ends the processing in this flowchart in S511.

In S512, the CPU 205 receives an input from the operation unit 212, operates as an initiator in the NFC peer mode, or in the reader/writer mode, and performs desired NFC processing. For example, if the partner device is an NFC card of electronic money, the CPU 205 performs payment processing or the like in the reader/writer mode, and if the partner device is a smartphone, the CPU 205 transmits data such as a URI as an initiator in the peer mode. The CPU 205 ends the processing in this flowchart in S512. Note that, if the CPU 205 has not received an input from the operation unit 212, the CPU 205 does not perform processing.

<Power Receiving Processing of Electronic Device 200>

Figure 6:
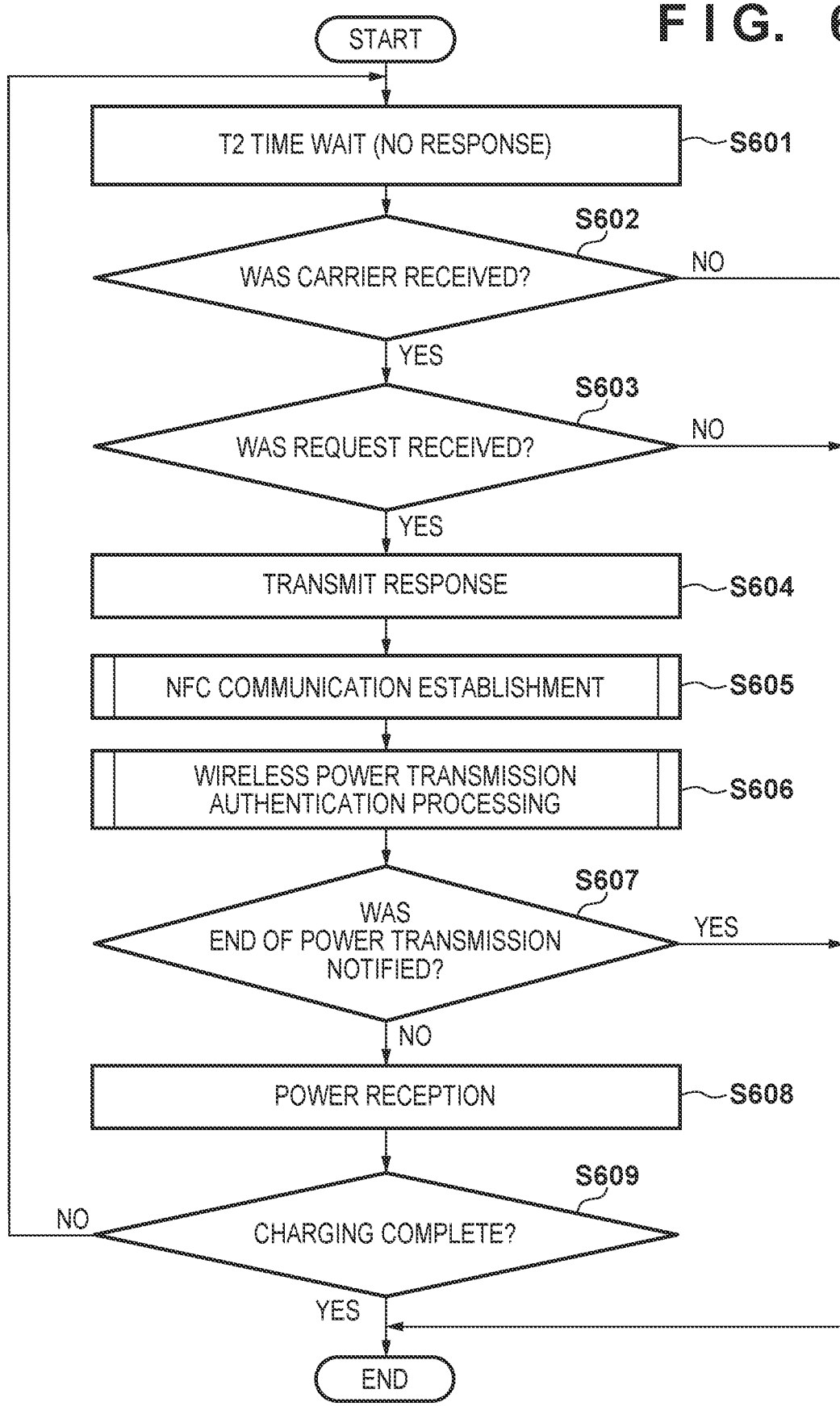
FIG. 6 is a flowchart illustrating power receiving processing of the electronic device of the embodiment.

FIG. 6 shows an example of the power receiving processing in the electronic device 200 of the present embodiment. Note that the control program of this flowchart is stored in the ROM 206. Upon the electronic device 200 being powered on, the CPU 205 extracts the program stored in the ROM 206 to the RAM 207, and executes the program. The control program of this flowchart may be configured to regularly repeat execution of the processing.

In S601, the CPU 205 sets the interval time T2 received in S509 to the timer 211, and starts measurement. The CPU 205 does not return a response until the interval time T2 has elapsed, even if the communication circuit 204 has received a carrier. The CPU 205 advances the processing from S601 to S602 after the interval time T2 has elapsed.

In S602, the CPU 205 controls the communication circuit, and determines whether or not a carrier signal that is input via the antenna 201 and the matching circuit 202 has been received. If determined that the carrier has been received (Yes in S602), the CPU 205 advances the processing from S602 to S603. Also, if determined that the carrier has not been received (No in S602), the CPU 205 ends the processing of this flowchart in S602.

In S603, the CPU 205 controls the communication circuit 204, and determines whether or not a modulation signal superimposed on the received carrier signal has been received. For example, the electronic device 200 receives a request such as the SENS_REQ request of TypeA in the NFC standard, the SENSB_REQ request of TypeB, or the SENSF_REQ request of TypeF. If determined that any of the requests was received (Yes in S603), the CPU 205 advances the processing from S603 to S604. Also, if determined that no request was received (No in S603), the CPU 205 ends processing of this flowchart in S603.

In S604, the CPU 205 returns, by controlling the communication circuit 204, the SENS_RES response in the case of TypeA as the response, the SENSB_RES response in the case of TypeB as the response, the SENSF_RES response in the case of TypeF as the response through load modulation. Then, the CPU 205 advances the processing from S604 to S605.

In S605, the CPU 205 performs NFC communication establishment processing with the power supply apparatus 100 by controlling the communication circuit 204. The authentication processing defined in the NFC standard is performed as the NFC communication establishment processing. Here, the CPU 205 selects the same communication mode as the communication mode determined in S504 and is held in the RAM 207. The CPU 205, upon completing the NFC communication establishment processing, advances the processing from S605 to S606.

In S606, the CPU 205 performs authentication processing of the wireless power transmission by controlling the communication circuit 204. Specifically, the CPU 205 transmits/receives various types of information (compatibility with wireless power transmission, power that can be handled, battery level, whether or not a battery is present, etc.) for wireless power transmission in the NDEF format. Upon completing this processing, the CPU 205 causes the processing to transition from S606 to S607.

In S607, the CPU 205 determines whether or not an end notification of the power transmission has been received by controlling the communication circuit 204. If determined that the end notification of the power transmission was received (Yes in S607), the CPU 205 ends the processing of this flowchart in S607. Also, if determined that the end notification of the power transmission was not received (No in S607), the CPU 205 advances the processing from S607 to S608.

In S608, the CPU 205 receives the second power that is output from the power supply apparatus 100 via the antenna 201, the matching circuit 202, and the rectification smoothing circuit 203 by controlling the power controller 208 and the charging control unit 209, and charges the battery 210. The CPU 205 continues to charge the battery 210 until the second power output from the power supply apparatus 100 falls to a given level. If determined that the second power output from the power supply apparatus 100 fell to the given level, the CPU 205 advances the processing from S608 to S609.

In S609, the CPU 205 determines, by controlling the charging control unit 210, whether or not a battery of the battery 210 is fully charged by performing comparison with a pre-set threshold value. If determined that the battery of the battery 210 is fully charged, the CPU 205 ends the processing of this flowchart in S609. Also, if determined that the battery of the battery 210 is not fully charged, the CPU 205 returns the processing from S609 to S601.

A configuration in which, in the processing performed by the electronic device 200 described above, the electronic device 200 receives the carrier, which is the first power, in the card emulation mode or as a target in the peer mode has been described, but a configuration can be adopted in which the electronic device 200 outputs the carrier and performs power receiving processing while operating in the reader/writer mode or as an initiator in the peer mode. Note that, even in a case where the electronic device 200 operates in the reader/writer mode or as an initiator in the peer mode as well, the same mode can be selected in the power receiving processing.

As described above, according to the processing of the present embodiment, when NFC communication establishment processing is performed in a state in which both the power supply apparatus 100 and the electronic device 200 are continuously powered on after completing wireless power transmission at the second power level, because the RAMs in the respective apparatuses hold information regarding the wireless power transmission, the power supply apparatus 100 and the electronic device 200 can each continue the same communication mode.

Also, in the embodiment described above, an example in which authentication (or negotiation) is performed twice has been described, but even in a case where the authentication is performed three or more times, the apparatuses need only perform communication in communication modes stored in the respective RAMs.

The power supply apparatus 100 according to the present invention is not limited to the power supply apparatus 100 described in the present embodiment. Also, the electronic device 200 according to the present invention is not limited to the electronic device 200 described in the present embodiment. For example, the power supply apparatus 100 and the electronic device 200 according to the present invention can be realized by a system that is constituted by a plurality of apparatuses.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A power supply apparatus that is a power supply apparatus that wirelessly supplies power to an electronic device, comprising:
a power transmit unit configured to contactlessly transmit power;
a communicating unit configured to transmit/receive information;
a holding unit; and
a controlling unit configured to control the power transmit unit and the communication unit so that power transmission by the power transmit unit and communication by the communication unit are performed alternately and exclusively;
wherein, when authentication is first performed with an electronic device via the communicating unit, the control unit causes the holding unit to hold information indicating a communication mode when communication is established with the electronic device, and
wherein, when a second authentication is performed with the electronic device via the communicating unit in the communication by the communication unit during performing alternately the power transmit by the power transmit unit and the communication by the communication unit, the control unit controls the communication unit so as to perform communication in a communication mode based on the information held in the holding unit.

2. The power supply apparatus according to claim 1, wherein
the controlling unit includes:
a determining unit configured to, when a first authentication is performed with an electronic device, establish communication with the electronic device by outputting power at a pre-set first level via the communicating unit, and determine whether or not the electronic device includes a rechargeable battery; and
a transiting unit configured to, when the determining unit has determined that the electronic device includes a rechargeable battery, transit to re-authentication for charging the battery of the electronic device.

3. The power supply apparatus according to claim 2, wherein the communicating unit is a NFC (Near Field Communication) communicating unit.

4. The power supply apparatus according to claim 3, wherein the communicating unit has an initiator communication method in a peer mode and a target communication method in the peer mode.

5. The power supply apparatus according to claim 3, wherein, when the transiting unit causes re-authentication to be performed with the electronic device, the controlling unit does not reply to a carrier signal transmitted by the electronic device as an initiator, during a period before a time determined in the first authentication with the electronic device has elapsed.

6. The power supply apparatus according to claim 5, wherein, when re-authentication with the electronic device is performed, the controlling unit starts supplying power at the first level to the electronic device after the period has elapsed.

7. The power supply apparatus according to claim 3, wherein, when the transiting unit causes re-authentication to be performed with the electronic device, the controlling unit returns an error reply to a carrier signal transmitted by the electronic device as an initiator, during a period before a time determined in the first authentication with the electronic device has elapsed.

8. The power supply apparatus according to claim 7, wherein the controlling unit determines whether or not the battery of the electronic device is in a non-fully charged state in the re-authentication, and if the battery is in a non-fully charged state, the controlling unit starts supplying power at a second level to the electronic device.

9. The power supply apparatus according to claim 8, wherein the controlling unit, if it is determined that the battery of the electronic device is in a fully charged state, in the re-authentication, stops supplying power.

10. The power supply apparatus according to claim 8, wherein the controlling unit includes an extraneous object detection unit configured to detect an extraneous object other than an electronic device to which power is to be supplied, and
if the extraneous object detection unit has detected an extraneous object, the controlling unit stops supplying power.

11. An electronic device that includes a rechargeable battery, and can operate by wirelessly receiving power from a power supply apparatus, comprising:
a power receiving unit configured to contactlessly receive power;
a communicating unit configured to transmit and receive information;
a holding unit; and
a controlling unit configured to control the power receiving unit and the communication unit so that power reception by the power receiving unit and communication by the communication are performed alternately and exclusively;
wherein, when authentication is first performed with a power supply apparatus via the communication unit, the control unit causes the hold unit to hold information indicating a communication mode when communication is established with the power supply apparatus, and
wherein, when a second authentication is performed with the power supply apparatus in the communication during performing alternately the power reception by the power receiving unit and the communication by the communication unit, the control unit controls the communication unit so as to perform communication in a communication mode based on the information held in the holding unit.

12. The electronic device according to claim 11, wherein the controlling unit includes:
a determining configured to, when a first authentication is performed with the power supply apparatus, determine whether or not the power supply apparatus can supply power for charging; and
a transiting unit configured to, when the determining unit has determined that the power supply apparatus can supply power for charging, transit to re-authentication for charging the battery.

13. The electronic device according to claim 12, wherein, when the transiting unit causes re-authentication to be performed with the power supply apparatus, the controlling unit does not reply to a carrier signal transmitted by the power supply apparatus as an initiator, during a period before a time determined in the first authentication with the power supply apparatus has elapsed.

14. The electronic device according to claim 13, wherein the controlling unit, when performing re-authentication with the power supply apparatus, starts receiving power for charging the battery after the period has elapsed.

15. A control method of a power supply apparatus that includes a power transmit unit configured to contactlessly transmit power and a communicating unit configured to transmit/receive information, and wirelessly supplies power to an electronic device, the method comprising:
- a control step of controlling the power transmit unit and the communication unit so that power transmit by the power transmit unit and communication by the communication are performed alternately and exclusively;
- a holding step of holding, when authentication is first performed with an electronic device via the communicating unit, information indicating a communication mode when communication is established with the electronic device; and
- a controlling step of controlling the communicating unit so as to perform communication in a communication mode based on the information held in the holding step, when a second authentication is performed with the electronic device via the communicating unit in the communication by the communication unit during performing alternately the power transmit by the power transmit unit and the communication by the communication unit.

16. A control method of an electronic device including a rechargeable battery, a power receiving unit configured to contactlessly receive power, and a communicating unit configured to transmit and receive information, the method comprising:
- a controlling step of controlling the power receiving unit and the communication unit so that power reception by the power receiving unit and communication by the communication unit are performed alternately and exclusively;
- a holding step of holding, when authentication is first performed with a power supply apparatus via the communicating unit, information indicating a communication mode when communication is established with the power supply apparatus; and
- a controlling step of controlling the communicating unit so as to perform communication in a communication mode based on the information held in the holding step, when a second authentication is performed with the power supply apparatus via the communicating unit in the communication during performing alternately the power reception by the power receiving unit and the communication by the communication unit.

17. A power receiving apparatus, comprising:
- a power receiving unit configured to wirelessly receive power from a power supply apparatus;
- a communicating unit configured to wirelessly communicate with the power supply apparatus; and
- a control unit configured to control the power receiving unit and the communication unit so that power reception by the power receiving unit and communication by the communication unit are performed alternately and exclusively;
- wherein the controlling unit controls the communicating unit so as to operate in one of a first mode of transmitting a carrier signal using the communicating unit, and a second mode of, without transmitting a carrier signal, receiving a carrier signal from the power supply apparatus using the communicating unit,
- wherein the controlling unit, upon starting processing for wirelessly receiving power (power reception) from the power supply apparatus, controls the communicating unit so as to operate in the second mode, in wireless communication repeatedly established for controlling the power reception.

* * * * *